United States Patent
Mita et al.

(10) Patent No.: US 9,114,706 B2
(45) Date of Patent: Aug. 25, 2015

(54) CONTROL APPARATUS FOR FOUR WHEEL DRIVE VEHICLE

(71) Applicant: JTEKT Corporation, Osaka-shi (JP)

(72) Inventors: Masaki Mita, Chiryu (JP); Hiroshi Takuno, Nukata-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/102,763

(22) Filed: Dec. 11, 2013

(65) Prior Publication Data

US 2014/0172258 A1   Jun. 19, 2014

(30) Foreign Application Priority Data

Dec. 17, 2012   (JP) .................................. 2012-274787

(51) Int. Cl.
| | | |
|---|---|---|
| *G06F 7/00* | (2006.01) |
| *G06F 17/00* | (2006.01) |
| *G06F 19/00* | (2011.01) |
| *B60K 23/08* | (2006.01) |
| *B60K 17/344* | (2006.01) |
| *B60K 17/35* | (2006.01) |

(52) U.S. Cl.
CPC .............. *B60K 23/0808* (2013.01); *B60K 23/08* (2013.01); *B60K 17/344* (2013.01); *B60K 17/35* (2013.01); *B60K 2023/0833* (2013.01); *B60W 2520/10* (2013.01); *B60W 2520/28* (2013.01); *B60W 2540/10* (2013.01); *B60W 2710/027* (2013.01)

(58) Field of Classification Search
CPC ............................ B60K 23/08; B60K 23/0808
USPC ............................................................ 701/69
See application file for complete search history.

(56) References Cited

U.S. PATENT DOCUMENTS

2010/0274456 A1   10/2010   Kondo et al.
2013/0226421 A1*  8/2013   Horaguchi et al. ............. 701/67

FOREIGN PATENT DOCUMENTS

| JP | 2010-254058 A | 11/2010 |
| JP | 2012-061923 A | 3/2012 |

OTHER PUBLICATIONS

U.S. Appl. No. 14/008,803, filed Dec. 23, 2013, Shigeta et al.

* cited by examiner

*Primary Examiner* — Maceeh Anwari
(74) *Attorney, Agent, or Firm* — Oblon, McClelland, Maier & Neustadt, L.L.P.

(57) ABSTRACT

An ECU of a four wheel drive vehicle controls a transmission torque of a driving force transmission apparatus provided between a rear differential and a left rear wheel. The ECU includes a first computation unit that computes a command torque to be transmitted to the left rear wheel by the driving force transmission apparatus, based on a traveling state of the four wheel drive vehicle; and a second computation unit that corrects the command torque computed by the first computation unit, if a difference between rotation speeds of a pair of side gears of the rear differential is larger than or equal to a predetermined value.

1 Claim, 6 Drawing Sheets

CONTROL APPARATUS FOR FOUR WHEEL DRIVE VEHICLE

INCORPORATION BY REFERENCE

The disclosure of Japanese Patent Application No. 2012-274787 filed on Dec. 17, 2012 including the specification, drawings and abstract, is incorporated herein by reference in its entirety.

BACKGROUND OF THE INVENTION

1. Field of the Invention

The invention relates to a control apparatus for a four wheel drive vehicle.

2. Description of the Related Art

Four wheel drive vehicles, in which a driving force from a drive source (engine) is always transmitted to a pair of right and left main driving wheels (front wheels), and is transmitted to a pair of right and left auxiliary driving wheels (rear wheels) via a plurality of clutches, have been known (refer to Japanese Patent Application Publication No. 2010-254058 (JP 2010-254058 A) and Japanese Patent Application Publication No. 2012-61923 (JP 2012-61923 A)).

In each of the four wheel drive vehicles described in JP 2010-254058 A and JP 2012-61923 A, a dog clutch is disposed between the drive source and a propeller shaft that transmits the driving force in the longitudinal direction of the vehicle. Further, a multiple disc clutch is disposed between an auxiliary driving wheel-side differential apparatus to which the driving force is transmitted by the propeller shaft and one of the auxiliary driving wheels. When the vehicle travels in a two wheel drive mode in which the driving force is transmitted only to the main driving wheels, the transmission of the driving force via the dog clutch and the multiple disc clutch is interrupted, and therefore, rotation of the propeller shaft and rotation of a differential case of the auxiliary driving wheel-side differential apparatus are restrained to reduce the travel resistance.

When the vehicle travels in a four wheel drive mode in which the driving force of the drive source is transmitted to the main driving wheels and the auxiliary driving wheels, the dog clutch is engaged, and therefore, a driving force in accordance with the transmission torque of the multiple disc clutch is transmitted to the auxiliary driving wheel side. The transmission torque of the multiple disc clutch is controlled by an Electronic Control Unit (ECU). The ECU computes a driving force that needs to be transmitted to the auxiliary driving wheel side, on the basis of signals from various sensors that detect the traveling state of the vehicle, and then controls the transmission torque of the multiple disc clutch according to a result of the computation.

The inventor of the present application measured the driving force transmitted to the auxiliary driving wheel side in a four wheel drive vehicle configured as described above, and found that the driving force transmitted to the auxiliary driving wheel side when the vehicle turns left is different from that when the vehicle turns right, even if the transmission torque of the multiple disc clutch is controlled in the same manner. The inventor of the present application earnestly investigated the cause of this phenomenon, and obtained a finding that the difference in the driving force transmitted to the auxiliary driving wheels depending on the direction of turn of the vehicle is related to the Torque Bias Ratio (TBR) of the differential apparatus at the auxiliary driving wheel side, and made the invention of the present application.

SUMMARY OF THE INVENTION

An object of the invention is to provide a control apparatus for a four wheel drive vehicle, which can increase the accuracy of a driving force transmitted to an auxiliary driving wheel side in a four wheel drive vehicle in which a driving force transmission apparatus is disposed between differential apparatus and one of a pair of right and left auxiliary driving wheels, and a transmission torque of the driving force transmission apparatus is adjustable.

According to an aspect of the invention, there is provided a control apparatus for a four wheel drive vehicle, the control apparatus being provided in a four wheel drive vehicle including a pair of right and left main driving wheels and a pair of right and left auxiliary driving wheels, the control apparatus controlling a transmission torque of a driving force transmission apparatus provided between one of a pair of output members of a differential apparatus at an auxiliary driving wheel side and one of the right and left auxiliary driving wheels, and the control apparatus including: a first computation unit that computes a transmission torque to be transmitted to the one of the auxiliary driving wheels by the driving force transmission apparatus, based on a traveling state of the four wheel drive vehicle; and a second computation unit that corrects the transmission torque computed by the first computation unit, if a difference between rotation speeds of the output members of the differential apparatus is larger than or equal to a predetermined value.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
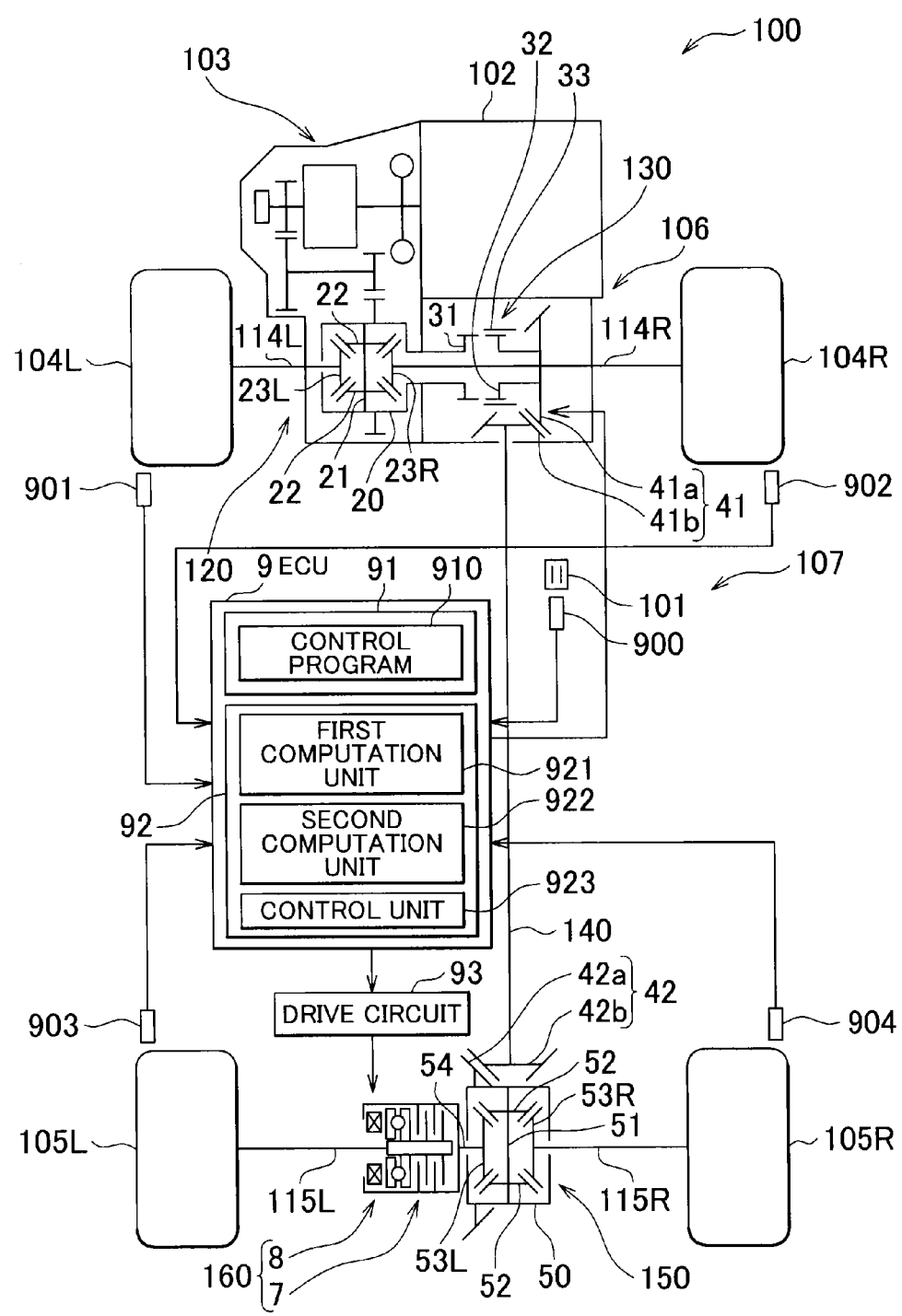
FIG. 1 is a schematic diagram showing a configuration example of a four wheel drive vehicle according to an embodiment of the invention.

FIG. 1 is a schematic diagram showing a configuration example of a four wheel drive vehicle according to an embodiment of the invention. This four wheel drive vehicle 100 includes an engine 102, a transmission 103, a pair of right and left front wheels 104R, 104L, a pair of right and left rear wheels 105R, 105L, a first driving force transmission system 106 and a second driving force transmission system 107. The engine 102 is a drive source that outputs a driving force in accordance with the amount of depression of an accelerator pedal 101 that is operated by a driver. The transmission 103 changes the speed of an output of the engine 102. The first driving force transmission system 106 transmits the driving force of the engine 102 to the front wheels 104R, 104L. The second driving force transmission system 107 transmits the driving force of the engine 102 to the rear wheels 105R, 105L. The front wheels 104R, 104L are main driving wheels to which the driving force of the engine 102 is always transmitted when the vehicle 100 is traveling. The rear wheels 105R, 105L are auxiliary driving wheels to which a necessary torque is transmitted according to the traveling state of the vehicle 100.

The front wheels 104R, 104L are provided with wheel speed sensors 902, 901, and the rear wheels 105R, 105L are provided with wheel speed sensors 904, 903. The wheel speed sensors 902 to 904 are provided to detect rotation speeds of the respective wheels. Furthermore, an accelerator operation amount sensor 900 is provided for the accelerator pedal 101.

The first driving force transmission system 106 includes a front differential 120 and front wheel-side drive shafts 114R, 114L. The front wheel-side drive shafts 114R, 114L transmit an output torque of the front differential 120 to the right and left front wheels 104R, 104L. The second driving force transmission system 107 includes a dog clutch 130, a propeller shaft 140, a rear differential 150, a driving force transmission apparatus 160, and rear wheel-side drive shafts 115R, 115L.

The front differential 120 includes a differential case 20, a pinion shaft 21, a pair of pinion gears 22, 22, and a pair of side gears 23R, 23L. The differential case 20 rotates due to a torque output from the transmission 103. The pinion shaft 21 is retained by the differential case 20. The pinion gears 22, 22 are constituted by bevel gears that are rotatably supported on the pinion shaft 21. The side gears 23R, 23L are constituted by bevel gears that mesh with the pinion gears 22, 22 and whose gear axes are orthogonal to those of the pinion gears 22, 22. Further, the front differential 120 is configured so that the torque is distributed from the right-side side gear 23R to the right front wheel 104R via the right-side drive shaft 114R, and the torque is distributed from the left-side side gear 23L to the left front wheel 104L via the left-side drive shaft 114L.

The dog clutch 130 has a first tooth portion 31, a second tooth portion 32 and a tubular sleeve 33. The first tooth portion 31 is fixed to an outer peripheral portion of the differential case 20 of the front differential 120 so that the first tooth portion 31 is not rotatable relative to the differential case 20. The second tooth portion 32 is fixed to a ring gear 41a described later so that the second tooth portion 32 is not rotatable relative the ring gear 41a. The sleeve 33 is movable forward and backward in the direction of a rotation axis of the differential case 20. The dog clutch 130 is configured so that the first tooth portion 31 and the second tooth portion 32 are connected with each other so that the torque can be transmitted between the first tooth portion 31 and the second tooth portion 32 when the tubular sleeve 33 is moved in one direction, and the first tooth portion 31 and the second tooth portion 32 are disconnected from each other when the sleeve 33 is moved in the other direction. The detailed configuration of the dog clutch 130 will be described later.

At the front wheel side of the propeller shaft 140, there is provided a first gear mechanism 41 that includes a ring gear 41a and a pinion gear 41b. The ring gear 41a is constituted by a bevel gear that rotates together with the second tooth portion 32 of the dog clutch 130. The pinion gear 41b is constituted by a bevel gear that meshes with the ring gear 41a and that is fixed to an end of the propeller shaft 140.

Furthermore, at the rear wheel side of the propeller shaft 140, there is provided a second gear mechanism 42 that includes a ring gear 42a and a pinion gear 42b. The ring gear 42a is constituted by a bevel gear that is fixed to a differential case 50 of the rear differential 150. The pinion gear 42b is constituted by a bevel gear that meshes with the ring gear 42a and that is fixed to the other end of the propeller shaft 140.

The rear differential 150 includes the differential case 50, a pinion shaft 51, a pair of pinion gears 52, 52, and a pair of side gears 53R, 53L. The differential case 50 rotates due to the torque transmitted via the propeller shaft 140. The pinion shaft 51 is retained by the differential case 50. The pinion gears 52, 52 are constituted by bevel gears that are rotatably supported on the pinion shaft 51. The side gears 53R, 53L are a pair of output members constituted by bevel gears which mesh with the pinion gears 52, 52 and whose gear axes are orthogonal to those of the pinion gears 52, 52. An intermediate shaft 54 is disposed between the left-side side gear 53L and the driving force transmission apparatus 160. The left-side side gear 53L is connected to the intermediate shaft 54 so that the left-side side gear 53L is not rotatable relative to the intermediate shaft 54. Further, the right-side side gear 53R is connected to the right-side drive shaft 115R so as to rotate at the same speed as the speed of the right-side drive shaft 115R. Specifically, the left-side side gear 53L outputs the driving force to the left rear wheel 105L, and the right-side side gear 53R outputs the driving force to the right rear wheel 105R.

The driving force transmission apparatus 160 includes a multiple disc clutch 7 and a pressing mechanism 8. The pressing mechanism 8 presses the multiple disc clutch 7 in such a manner that the pressing force is variable. The driving force transmission apparatus 160 is configured so that a torque in accordance with the pressing force applied to the multiple disc clutch 7 by the pressing mechanism 8 is transmitted from the intermediate shaft 54 to the left-side drive shaft 115L-side. The detailed configuration of the driving force transmission apparatus 160 will be described later.

The four wheel drive vehicle 100 is also provided with an Electronic Control Unit (ECU) 9 as a control apparatus that controls the second driving force transmission system 107. The ECU is capable of obtaining information about the traveling state of the vehicle, such as the accelerator operation amount detected by the accelerator operation amount sensor 900, and the rotation speeds of the front wheels 104R, 104L detected by the wheel speed sensors 902, 901 and the rotation speeds of the rear wheels 105R, 105L detected by the wheel speed sensor 904, 903, for example, via a vehicle-mounted communication network (Controller Area Network (CAN)). Further, a drive circuit 93 that outputs electric current for driving the pressing mechanism 8 of the driving force transmission apparatus 160 is connected to the ECU 9.

The ECU 9 includes a storage portion 91 and a control portion 92. The storage portion 91 includes storage elements such as a Read-Only Memory (ROM) and a Random Access Memory (RAM). The control portion 92 includes a Central Processing Unit (CPU) that operates according to a control program 910 stored in the storage portion 91. The control portion 92 operates according to the control program 910. Therefore, the control portion 92 functions as a first computation unit 921 that computes a transmission torque of the driving force transmission apparatus 160 on the basis of the traveling state of the four wheel drive vehicle 100, a second computation unit 922 that corrects the transmission torque computed by the first computation unit 921, on the basis of the rotation speed difference between the rear wheels 105R, 105L, and a control unit 923 that controls the driving force transmission apparatus 160 according to the transmission torque corrected by the second computation unit 922.

The drive circuit 93 receives a control signal from the ECU 9 (the control unit 923), and outputs an electric current to an electromagnetic coil (described later) that constitutes the pressing mechanism 8. The drive circuit 93 includes a current output circuit that is operated, for example, under a Pulse Width Modulation (PWM) control. The drive circuit 93 is capable of continuously adjusting the amount of electric current supplied to the pressing mechanism 8, to a value in accordance with the control signal from the ECU 9.

With the foregoing configuration, in the first driving force transmission system 106, the driving force is transmitted from the side gears 23R, 23L of the front differential 120 to the front wheels 104R, 104L via the right and left drive shafts 114R, 114L. Further, in the second driving force transmission system 107, the driving force is transmitted from the differential case 20 of the front differential 120 to the rear differential 150 via the dog clutch 130, the first gear mechanism 41, the propeller shaft 140 and the second gear mechanism 42, and then the driving force is transmitted to the left rear wheel 105L via the driving force transmission apparatus 160 and the left-side drive shaft 115L, and to the right rear wheel 105R via the right-side drive shaft 115R.

Figure 2:
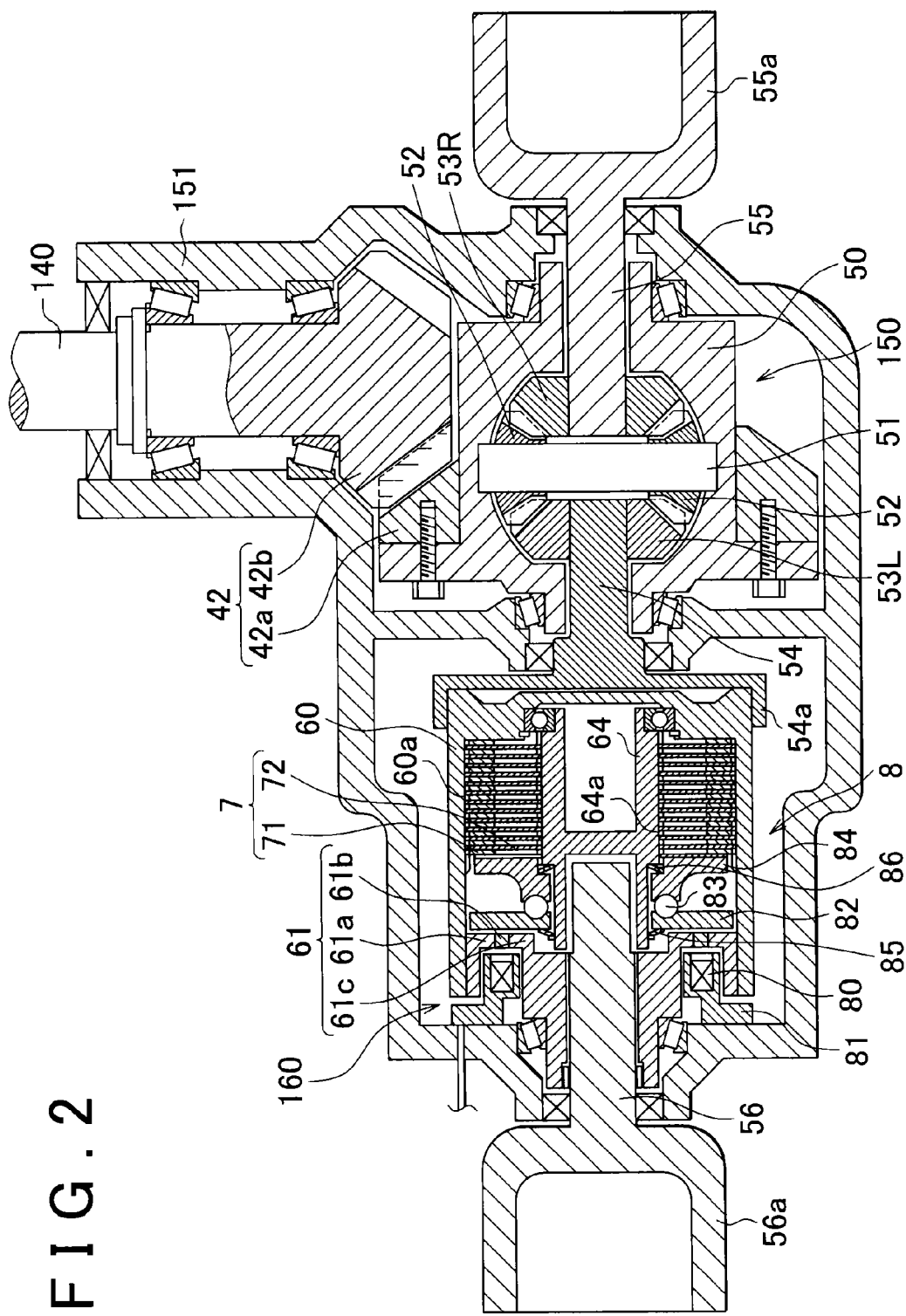
FIG. 2 is a sectional view showing a configuration example of a driving force transmission apparatus and portions near the driving force transmission apparatus.

FIG. 2 is a sectional view showing a configuration example of the driving force transmission apparatus 160 and portions near the driving force transmission apparatus 160. The driving force transmission apparatus 160 is housed, together with the rear differential 150, in a differential carrier 151. The driving force transmission apparatus 160 includes a bottomed cylindrical outer housing 60 that is connected to the intermediate shaft 54 so that the outer housing 60 is not rotatable relative to the intermediate shaft 54. The driving force transmission apparatus 160 includes the multiple disc clutch 7 and the pressing mechanism 8 arranged within the outer housing 60.

An outer peripheral surface of a bottom portion of the outer housing 60 is connected to a flange 54a of the intermediate shaft 54 so that the outer housing 60 rotates together with the intermediate shaft 54. A spline portion 60a is formed on an inner peripheral surface of a cylindrical portion of the outer housing 60. The spline portion 60a includes a plurality of spline teeth extending in the axial direction. An opening end portion of the outer housing 60 is closed by an annular rear housing 61.

The rear housing 61 includes a first element 61a, a ring-shaped second element 61b, and a third element 61c. The first element 61a is constituted by a magnetic material that is fixed to the opening portion of the outer housing 60 so that the first element 61a is not rotatable relative to the outer housing 60, by fixing means such as screwing or welding. The second element 61b is constituted by a non-magnetic material that is fixed to an inside of the first element 61a. The third element 61c is constituted by a magnetic material that is fixed to an inside of the second element 61b.

At an inner peripheral portion of the outer housing 60, there is disposed a hollow cylindrical inner shaft 64 that is supported coaxially with the outer housing 60 so that the inner shaft 64 is rotatable relative to the outer housing 60. On an outer peripheral surface of the inner shaft 64, a spline portion 64a is formed at a region that faces the spline portion 60a of the outer housing 60. The spline portion 64a includes a plurality of spline teeth extending in the axial direction. Further, a shaft-shaped member 56 is spline-fitted to an inner peripheral surface of the inner shaft 64 so that the shaft-shaped member 56 is not rotatable relative to the inner shaft 64. The shaft-shaped member 56 includes an outer ring 56a of a constant velocity joint, to which an end of the left-side drive shaft 115L (shown in FIG. 1) is oscillatably connected.

The multiple disc clutch 7 has a configuration in which a plurality of annular outer clutch plates 71 and a plurality of annular inner clutch plates 72 are alternately disposed in the axial direction. At an outer peripheral edge of each outer clutch plate 71, a plurality of protrusions that engages with the spline portion 60a of the outer housing 60 is formed. Further, at an inner peripheral edge of each inner clutch plate 72, a plurality of protrusions that engages with the spline portion 64a of the inner shaft 64 is formed. With this configuration, the outer clutch plates 71 are restricted from rotating relative to the outer housing 60, and are movable in the axial direction, and the inner clutch plates 72 are restricted from rotating relative to the inner shaft 64, and are movable in the axial direction.

The pressing mechanism 8 is disposed adjacent to the multiple disc clutch 7 in the directions of the axis. The pressing mechanism 8 includes an electromagnetic coil 80, a yoke 81, an annular first cam member 82, an annular second cam member 84 and a plurality of spherical cam followers 83. The yoke 81 is constituted by a magnetic material that supports the electromagnetic coil 80. The second cam member 84 is disposed so as to face the first cam member 82. The cam followers 83 are interposed between the first cam member 82 and the second cam member 84.

The electromagnetic coil 80 is disposed such that the rear housing 61 is interposed between the electromagnetic coil 80 and the first cam member 82. The electromagnetic coil 80 is configured so as to attract the first cam member 82 toward the rear housing 61 by a magnetic force generated by energization of the electromagnetic coil 80. The electromagnetic coil 80 is supplied with an excitation current from the drive circuit 93 of the ECU 9.

The second cam member 84 is disposed so that a side surface of the second cam member 84 in the axial direction faces one inner clutch plate 72 that is disposed closest to the pressing mechanism 8 among the inner clutch plates 72 of the multiple disc clutch 7. At a portion of an inner peripheral surface of the second cam member 84, a plurality of protrusions that engages with the spline portion 64a of the inner shaft 64 is provided. The second cam member 84 is restricted from rotating relative to the inner shaft 64, and is movable in the axial direction.

Cam surfaces are respectively formed in opposed surfaces of the first cam member 82 and the second cam member 84. The cam surfaces are constituted by inclined surfaces whose depth in the axial direction changes in the circumferential direction. The cam followers 83 are disposed so as to roll along the cam surfaces of the first and second cam members 82, 84. Further, the first cam member 82 and the second cam member 84 are urged by a coned disc spring 85 and a coned disc spring 86, respectively, so as to approach each other.

With the foregoing configuration, when the first cam member 82 frictionally slides with respect to the rear housing 61 due to the magnetic force of the electromagnetic coil 80, the first cam member 82 receives a rotation force from the rear housing 61. Due to this rotation force, the first cam member 82 and the second cam member 84 rotate relative to each other. Due to this relative rotation, the cam followers (rolling elements) 83 roll on the cam surfaces of the first cam member 82 and the second cam member 84, and thus, thrust in the axial direction is generated. The second cam member 84, which receives this thrust, presses the multiple disc clutch 7.

Since the rotation force that the first cam member 82 receives from the rear housing 61 changes according to the strength of the magnetic force of the electromagnetic coil 80, the pressing force for pressing the multiple disc clutch 7 can be adjusted by controlling the electric current supplied to the electromagnetic coil 80. Therefore, the torque transmitted via the multiple disc clutch 7 can be adjusted. That is, the multiple disc clutch 7 is capable of changing the driving forces transmitted toward the rear wheels 105R, 105L stepwise or continuously.

Further, when the energization of the electromagnetic coil 80 is stopped, the first cam member 82 moves away from the rear housing 61 due to the spring force of the coned disc spring 85, and therefore ceases to receive the rotation force that rotates the first cam member 82 relative to the second cam member 84. As a result, the thrust in the axial direction disappears, and the second cam member 84 moves in a direction away from the multiple disc clutch 7 due to the spring force of the coned disc spring 86.

With the foregoing configuration, the driving force transmitted to the left-side side gear 53L of the rear differential 150 is adjusted by the driving force transmission apparatus 160 in a manner such that transmission of the driving force can be interrupted, and then the adjusted driving force is transmitted to the left rear wheel 105L via the shaft-shaped member 56 and the left-side drive shaft 115L. Further, the driving force transmitted to the right-side side gear 53R of the rear differential 150 is transmitted to the right rear wheel 105R via a shaft-shaped member 55 that is connected to the right-side side gear 53R so that the shaft-shaped member 55 is not rotatable relative to the right-side side gear 53R, and the right-side drive shaft 115R oscillatably connected to an outer ring 55a of the constant velocity joint provided at an end of the shaft-shaped member 55.

Figure 3A:
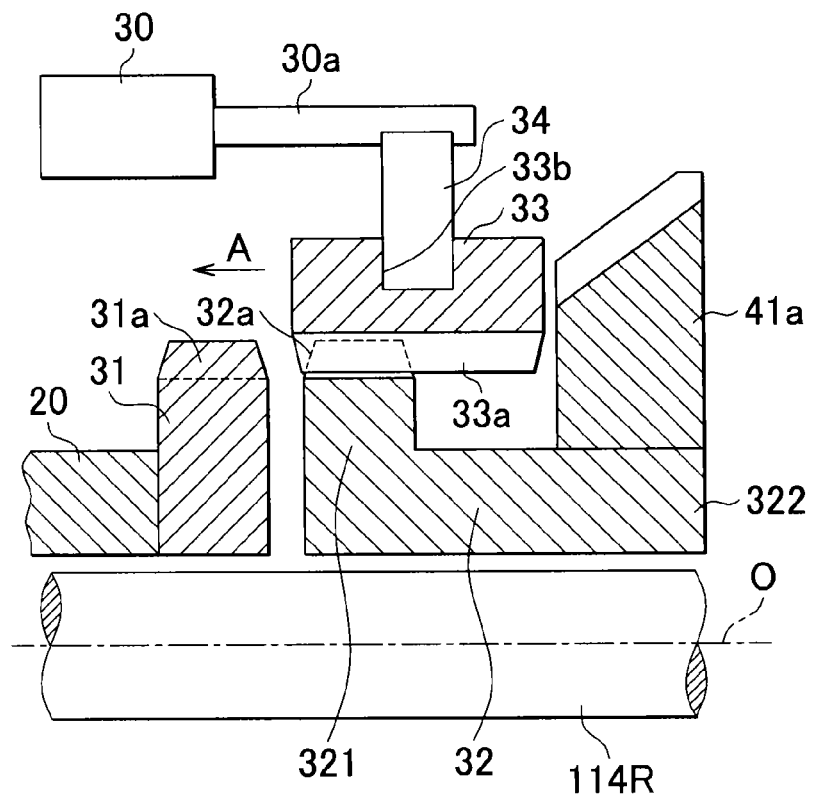
FIG. 3A is a sectional view showing a configuration example of a dog clutch and portions near the dog clutch.
Figure 3B:
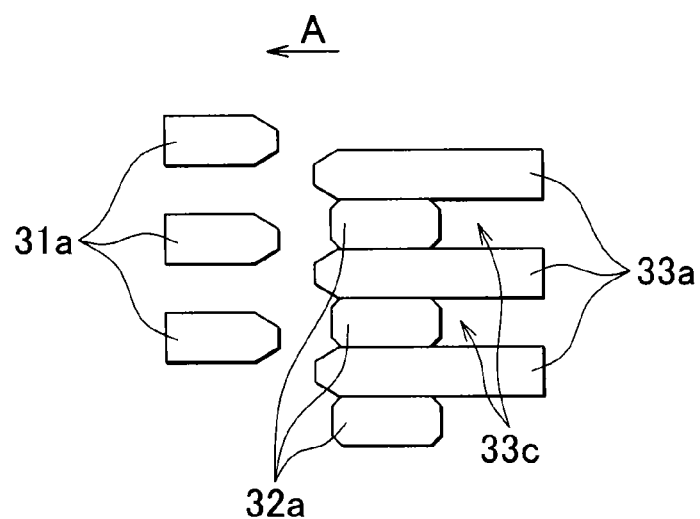
FIG. 3B is an explanatory diagram schematically showing meshing portions of the dog clutch in a disengaged state.

FIG. 3A is a sectional view showing a configuration example of the dog clutch 130 and portions near the dog clutch 130. FIG. 3B is an explanatory diagram schematically showing meshing portions of the dog clutch 130 in a disengaged state.

The dog clutch 130 has the first tooth portion 31, the second tooth portion 32, the tubular sleeve 33 and the actuator 30, as described above. The first tooth portion 31 is fixed to the differential case 20 of the front differential 120 so that the first tooth portion 31 is not rotatable relative to the differential case 20. The second tooth portion 32 is fixed to the ring gear 41a so that the second tooth portion 32 is not rotatable relative to the ring gear 41a. The sleeve 33 is movable forward and backward in the direction of the rotation axis of the differential case 20. The actuator 30 moves the sleeve 33 forward and backward. The actuator 30 is constituted by, for example, an electromagnetic actuator in which a movable iron core is moved by a magnetic force generated by energization of a magnetization coil.

The first tooth portion 31 has an annular shape, and the drive shaft 114R connected to the right front wheel 104R is inserted through an inner peripheral side of the first tooth portion 31. On an outer peripheral surface of the first tooth portion 31, a plurality of spline teeth 31a is formed along the rotation axis O of the differential case 20.

The second tooth portion 32 is formed in a tubular shape, and the drive shaft 114R is inserted through an inner peripheral side of the second tooth portion 32. The second tooth portion 32 is rotatable coaxially with and relative to the first tooth portion 31. Further, on an outer peripheral surface of the second tooth portion 32, a plurality of spline teeth 32a is formed along the rotation axis O of the differential case 20.

The sleeve 33 is a tubular connecting member that is supported on an outer peripheral side of the first tooth portion 31 and the second tooth portion 32 so as to be movable coaxially with the first and second tooth portions 31, 32 and in the axial direction of the first and second tooth portions 31, 32. On an inner peripheral surface of the sleeve 33, a plurality of spline teeth 33a is formed. The spline teeth 33a are capable of meshing with the spline teeth 31a of the first tooth portion 31 and the spline teeth 32a of the second tooth portion 32. Recess portions 33c are formed in a manner such that each of the recess portions 33c is located between adjacent spline teeth 33a. The spline teeth 31a, 32a engage with the recess portions 33c. The dog clutch 130 transmits driving force due to engagement between the spline teeth 31a, 32a and the recess portions 33c.

Further, on the outer peripheral surface of the sleeve 33, an annular engagement recess 33b that extends in the circumferential direction of the sleeve 33 is formed. One end portion of a movement member 34 that moves the sleeve 33 in the axial direction is engaged with the engagement recess 33b so as to be slidable. The other end portion of the movement member 34 is fitted to a shaft 30a of an actuator 30. The actuator 30, according to a control signal from the ECU 9 (shown in FIG. 1), moves the shaft 30a forward and backward in the direction parallel to the rotation axis O of the differential case 20. Accordingly, the movement member 34 and the sleeve 33 move in the axial direction along the rotation axis O.

In the disengaged state of the dog clutch 130 in which the spline teeth 33a of the sleeve 33 mesh with the spline teeth 32a of the second tooth portion 32 and do not mesh with the spline teeth 31a of the first tooth portion 31, the first tooth portion 31 and the second tooth portion 32 are rotatable relative to each other. Further, in the connected state of the dog clutch 130 in which the spline teeth 33a of the sleeve 33 mesh with both the spline teeth 31a of the first tooth portion 31 and the spline teeth 32a of the second tooth portion 32, the first tooth portion 31 and the second tooth portion 32 are connected to each other so that the first tooth portion 31 and the second tooth portion 32 are not rotatable relative to each other.

When the four wheel drive vehicle 100 travels in a four wheel drive mode, the sleeve 33 of the dog clutch 130 meshes with both the first tooth portion 31 and the second tooth portion 32 to connect the differential case 20 of the front differential 120 to the propeller shaft 140, and the electromagnetic coil 80 is energized to cause the driving force transmission apparatus 160 to transmit torque. Therefore, torque of the engine 102 is transmitted to the front wheels 104R, 104L and the rear wheels 105R, 105L.

On the other hand, when the four wheel drive vehicle 100 travels in a two wheel drive mode, the energization of the electromagnetic coil 80 is stopped to interrupt the driving force transmission performed by the driving force transmission apparatus 160, and the differential case 20 and the propeller shaft 140, which have been connected with each other by the dog clutch 130, are disconnected from each other. By interrupting the driving force transmission performed by the driving force transmission apparatus 160, the drive shaft 115L for the left rear wheel 105L is disconnected from the intermediate shaft 54, and accordingly, the driving force ceases to be transmitted to the right rear wheel 105R, either. This is based on a general feature of a differential apparatus, that is, a feature that if one of the two output shafts of the differential apparatus is idling, torque is not transmitted to the other output shaft.

Thus, when the four wheel drive vehicle 100 travels in the two wheel drive mode, the torque transmission performed by the first driving force transmission system 106 is interrupted at the upstream side of the propeller shaft 140 (the engine 102-side thereof) and at the downstream side of the propeller shaft 140 (the rear wheels 105R, 105L-side thereof), and thus, the propeller shaft 140 and the differential case 50 of the rear differential 150 connected to the propeller shaft 140 stop rotating relative to the vehicle body. This reduces the travel resistance of the vehicle caused by the rotational resistance of the propeller shaft 140 and the resistance in the stirring of lubricating oil by the ring gears 41a, 42a.

Figure 4A:
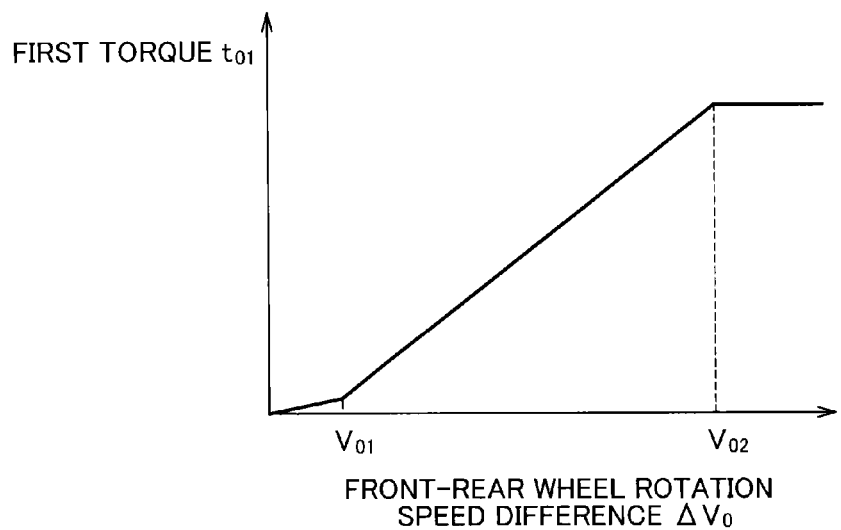
FIGS. 4A and 4B are examples of maps to which a control portion refers when the control portion, as a first computation unit, computes a transmission torque of the driving force transmission apparatus.
Figure 4B:
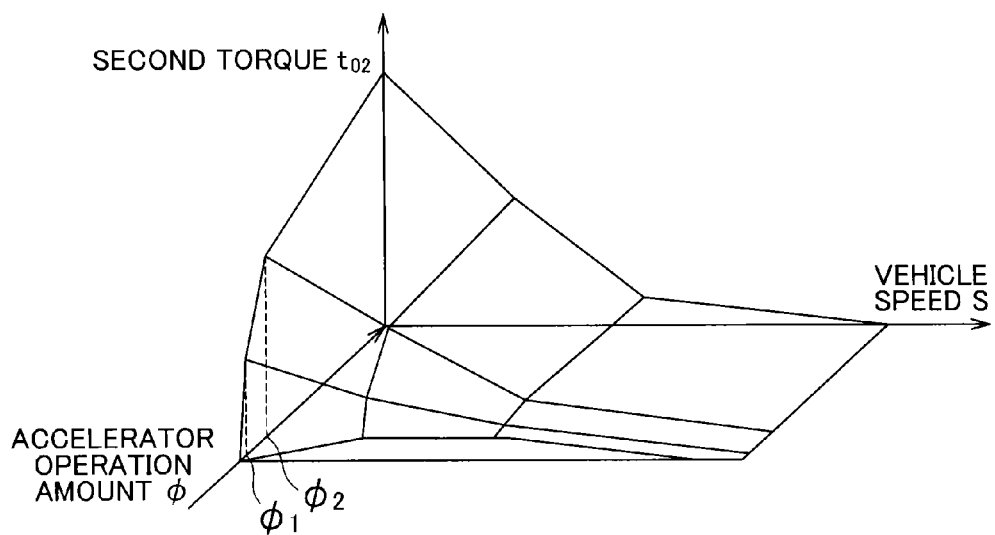

FIGS. 4A and 4B are examples of maps to which the control portion 92 refers when the control portion 92, as the first computation unit 921, computes the transmission torque of the driving force transmission apparatus 160. These maps are stored in the storage portion 91 of the ECU 9. The first computation unit 921 refers to these maps to compute the driving force to be transmitted to the left rear wheel 105L by the driving force transmission apparatus 160. Hereinafter, this driving force will be referred to as a command torque Tc.

FIG. 4A is an example of a graph showing a relation between a front-rear wheel rotation speed difference $\Delta V_0$ and a first torque $t_{01}$ based on the front-rear wheel rotation speed difference $\Delta V_0$. The front-rear wheel rotation speed difference $\Delta V_0$ is determined, for example, on the basis of a difference between an average of rotation speeds of the front wheels 104R, 104L detected by the wheel speed sensors 902, 901 and an average of rotation speeds of the rear wheels 105R, 105L detected by the wheel speed sensors 904, 903.

In this embodiment, as shown in FIG. 4A, in a small rotation speed difference region in which the front-rear wheel rotation speed difference $\Delta V_0$ is smaller than $\Delta V_{01}$, the first torque $t_{01}$ gently increases as the front-rear wheel rotation speed difference $\Delta V_0$ increases. In an intermediate rotation speed difference region in which the front-rear wheel rotation speed difference $\Delta V_0$ is larger than or equal to $V_{01}$ and smaller than $V_{02}$, as the front-rear wheel rotation speed difference $\Delta V_0$ increases, the first torque $t_{01}$ increases more sharply than in the small rotation speed difference region. Further, in a large rotation speed difference region in which the front-rear wheel rotation speed difference $\Delta V_0$ is larger than or equal to $V_{02}$, the first torque $t_{01}$ is a constant value.

Since the first torque $t_{01}$ is increased as the front-rear wheel rotation speed difference $\Delta V_0$ increases, for example, if the front wheels 104R, 104L slip, it is possible to distribute an increased proportion of the driving force of the engine 102 to the rear wheels 105R, 105L-side, and thus, it is possible to suppress the slip of the front wheels 104R, 104L.

FIG. 4B is an example of a graph showing a relation between the accelerator operation amount $\phi$ detected by the accelerator operation amount sensor 900 and a second torque $t_{02}$ based on the accelerator operation amount $\phi$. In this embodiment, a vehicle speed S is taken into account in addition to the accelerator operation amount $\phi$, and therefore, the graph shown in FIG. 4B shows a relation between the second torque $t_{02}$, and the accelerator operation amount $\phi$ and the vehicle speed S. The vehicle speed S can be determined, for example, on the basis of the rotation speeds of the front wheels 104R, 104L detected by the wheel speed sensors 902, 901, and the rotation speeds of the rear wheels 105R, 105L detected by the wheel speed sensors 904, 903.

As shown in FIG. 4B, in a small accelerator operation amount region in which the accelerator operation amount $\phi$ is smaller than $\phi 1$, the second torque $t_{02}$ increases relatively sharply as the accelerator operation amount $\phi$ increases. In an intermediate accelerator operation amount region in which the accelerator operation amount $\phi$ is larger than or equal to $\phi 1$ and smaller than $\phi 2$, as the accelerator operation amount $\phi$ increases, the second torque $t_{02}$ increases more gently than in the small accelerator operation amount region. Further, in a large accelerator operation amount region in which the accelerator operation amount $\phi$ is larger than or equal to $\phi 2$, as the accelerator operation amount $\phi$ increases, the second torque $t_{02}$ increases even more gently than in the intermediate accelerator operation amount region. The second torque $t_{02}$ is set so as to decrease as the vehicle speed S increases, as shown in FIG. 4B.

Since the second torque $t_{02}$ is increased as the accelerator operation amount $\phi$ increases, it is possible to more evenly distribute a large driving force from the engine 102 to the front wheels 104R, 104L and the rear wheels 105R, 105L during rapid acceleration, and thus, it is possible to avoid slip of the front wheels 104R, 104L, which may occur when the driving force concentrates on the front wheels 104R, 104L-side.

The control portion 92 (first computation unit 921) computes a sum of the first torque $t_{01}$ and the second torque $t_{02}$ to determine the command torque Tc (Tc=$t_{01}$+$t_{02}$). Then, the control portion 92, as the control unit 923, controls the drive circuit 93, and supplies a current in accordance with the command torque Tc to the electromagnetic coil 80 of the driving force transmission apparatus 160.

In the four wheel drive vehicle 100 configured as described above, when the control unit 923 controls the driving force transmission apparatus 160 according to the command torque Tc computed by the first computation unit 921, the driving force transmitted to the rear wheels 105R, 105L-side varies between the case where the rotation speed of the left rear wheel 105L is higher than the rotation speed of the right rear wheel 105R (e.g., when the vehicle turns right), and the case where the rotation speed of the left rear wheel 105L is lower than the rotation speed of the right rear wheel 105R (e.g., when the vehicle turns left), even if the current supplied to the electromagnetic coil 80 remains the same.

Figure 5:
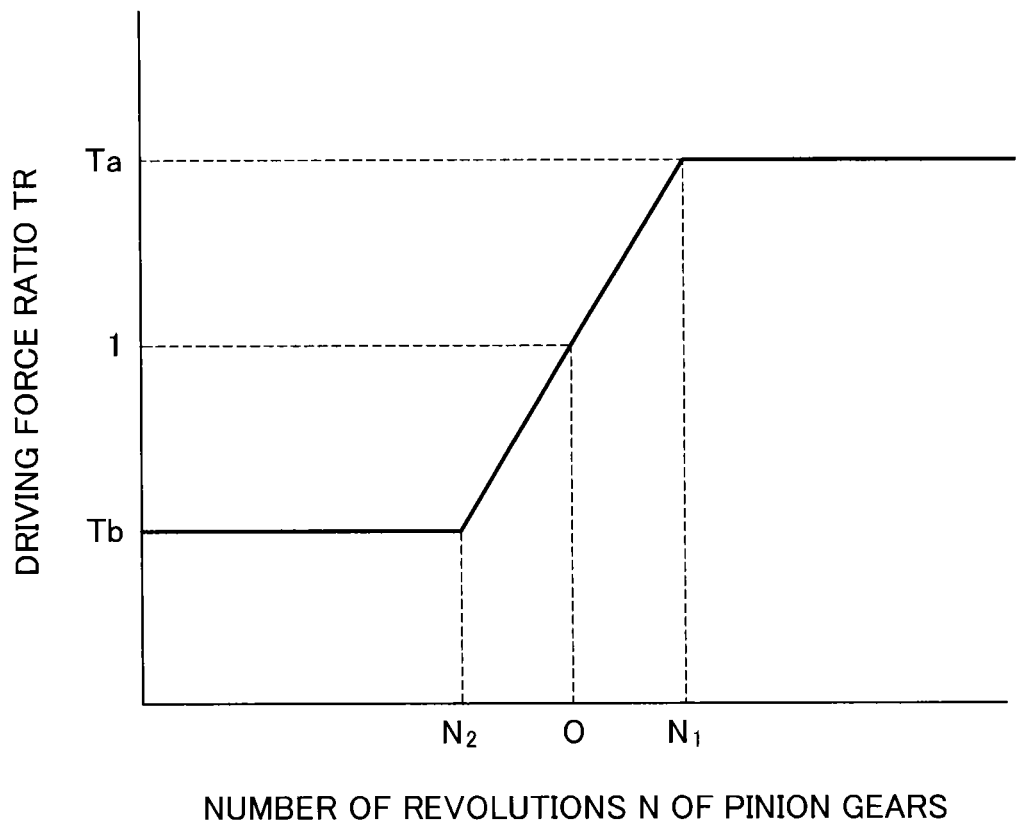
FIG. 5 is a graph showing a relation between a difference between rotation speeds of right and left rear wheels, and a driving force ratio between a driving force transmitted to the right rear wheel and a driving force transmitted to the left rear wheel.

FIG. 5 is a graph in which a horizontal axis represents the number of revolutions N (number of revolutions per unit time) of the pinion gears 52 of the rear differential 150 and a vertical axis represents a driving force ratio TR (TR=T2/T1) that is the ratio of the driving force transmitted to the right rear wheel 105R (referred to as the driving force T2) to the driving force transmitted to the left rear wheel 105L (referred to as the driving force T1).

The number of revolutions N of the pinion gears 52 is a positive value when the rotation speed of the left-side side gear 53L (hereinafter, referred to as a rotation speed V1) is higher than the rotation speed of the right-side side gear 53R (hereinafter, referred to as a rotation speed V2). Accordingly, the number of revolutions N of the pinion gears 52 is a negative value when the rotation speed V1 of the left-side side gear 53L is lower than the rotation speed V2 of the right-side side gear 53R. The number of revolutions N of the pinion gears 52 is proportional to a difference in the number of revolutions between the right-side side gear 53R and the left-side side gear 53L.

When the number of revolutions N of the pinion gears 52 is zero, that is, when the difference in the number of revolutions between the right-side side gear 53R and the left-side side gear 53L is zero, the driving force T1 transmitted to the left rear wheel 105L and the driving force T2 transmitted to the right rear wheel 105R are substantially equal (TR=1). However, when the number of revolutions N of the pinion gears 52 is a positive value (when the rotation speed V1 of the left-side side gear 53L is higher than the rotation speed V2 of the right-side side gear 53R), the driving force T1 transmitted to the left rear wheel 105L is smaller than the driving force T2 transmitted to the right rear wheel 105R (T1<T2, TR>1). When the number of revolutions N of the pinion gears 52 is a negative value (when the rotation speed V1 of the left-side side gear 53L is lower than the rotation speed V2 of the right-side side gear 53R), the driving force T1 transmitted to the left rear wheel 105L is larger than the driving force T2 transmitted to the right rear wheel 105R (T1>T2, TR<1).

Further, the driving force ratio TR gradually increases as the number of revolutions N of the pinion gears 52 increases in the range of the number of revolutions N of the pinion gears 52 from zero to a first predetermined value $N_1$. In the range in which the number of revolutions N of the pinion gears 52 is larger than the first predetermined value $N_1$, the driving force ratio TR is a substantially constant value (TR=Ta). Further, the driving force ratio TR gradually decreases as the absolute value of the number of revolutions N of the pinion gears 52 increases when the number of revolutions N of the pinion gears 52 is negative and the absolute value of the number of revolutions N is in the range from zero to the absolute value of a second predetermined value $N_2$ ($N_2$<0). In the range in which the absolute value of the number of revolutions N of the pinion gears 52 is larger than the absolute value of the second predetermined value $N_2$, the driving force ratio TR is a substantially constant value (TR=Tb).

The values at which the driving force ratio TR becomes constant due to the increase in the absolute value of the number of revolutions N of the pinion gears 52 (i.e., Ta and Tb in the graph in FIG. 5) are values that correspond to the Torque Bias Ratio (TBR) of the rear differential 150. For example, when the TBR of the rear differential 150 is 1.2, Ta=1.2 and Tb=1/1.2. The TBR herein refers to a ratio obtained by dividing a torque transmittable to one of a pair of wheels connected to a differential apparatus, by a torque transmittable to the other wheel, the friction force of the one wheel against a road surface being larger than the friction force of the other wheel against the road surface.

This TBR is, for example, larger than or equal to 2 in the case of a differential apparatus having a configuration that reduces differential rotation (e.g., a differential apparatus equipped with a limited-slip differential function of restricting the differential motion by frictional sliding between tip surfaces of pinion gears disposed in parallel with a drive shaft and an internal surface of a retainer for the pinion gears), and is a value approximately in the range of 1.1 to 1.3 in the case of a differential apparatus in which pinion gears mesh with a pair of side gears constituted by bevel gears and the gear axes of the pinion gears are orthogonal to those of the side gears, as in the embodiment (a so-called open differential). In the rear differential 150 according to the embodiment, the TBR is larger than 1, because the friction force or the like between an internal surface of the differential case 50 and gear back faces of the side gears 53R, 53L and the pinion gears 52, 52 that are pressed against the internal surface of the differential case 50 by the mesh reaction force of the side gears 53R, 53L and the pinion gears 52, 52 acts so as to reduce differential rotation between the right-side side gear 53R and the right-side side gear 53L.

For example, if the transmission torque transmitted by the driving force transmission apparatus 160 is 200 Nm, a torque (driving force) of 200 Nm is transmitted to the left rear wheel 105L regardless of the turning direction of the four wheel drive vehicle 100. However, when the rotation speed V1 of the left-side side gear 53L is higher than the rotation speed V2 of the right-side side gear 53R (e.g., when the vehicle turns right), a torque of 240 Nm (200×1.2 Nm) obtained by multiplying 200 Nm by the TBR (1.2) is transmitted to the right rear wheel 105R. As a result, the total of the driving forces transmitted to the rear wheels 105R, 105L-side is 440 Nm (200+240 Nm).

On the other hand, when the rotation speed V1 of the left-side side gear 53L is lower than the rotation speed V2 of the right-side side gear 53R (e.g., when the vehicle turns left), a torque of 167 Nm (200/1.2 Nm) obtained by multiplying 200 Nm by a reciprocal of the TBR (1.2) is transmitted to the right rear wheel 105R. As a result, the total of the driving forces transmitted to the rear wheels 105R, 105L-side is 367 Nm (200+167 Nm). Consequently, when the vehicle turns right or left, a torque in accordance with the command torque Tc, which is computed by the control portion 92 as the first computation unit 921 on the basis of the traveling state of the vehicle, is not transmitted to the rear wheels 105R, 105L-side.

In this embodiment, the second computation unit 922 corrects the command torque Tc computed by the first computation unit 921, on the basis of the number of revolutions of the pinion gears 52, so as to increase the accuracy of the torque transmitted to the rear wheels 105R, 105L-side. More specifically, when the condition of the rotation speed V1 of the left-side side gear 53L>the rotation speed V2 of the right-side side gear 53R is satisfied and the number of revolutions of the pinion gears 52 is larger than or equal to a predetermined value (i.e., when the difference between the rotation speed V1 of the left-side side gear 53L and the rotation speed V2 of the right-side side gear 53R is larger than or equal to the predetermined value), the second computation unit 922 performs a correction so as to reduce the command torque Tc computed by the first computation unit 921. When the condition of the rotation speed V1 of the left-side side gear 53L<the rotation speed V2 of the right-side side gear 53R is satisfied and the absolute value of the number of revolutions of the pinion gears 52 is larger than or equal to the absolute value of a predetermined value (e.g., when the difference between the rotation speed V1 of the left-side side gear 53L and the rotation speed V2 of the right-side side gear 53R is larger than or equal to the predetermined value), the second computation unit 922 performs the correction so as to increase the command torque Tc computed by the first computation unit 921. Next, an example of a process executed by the control portion 92 will be further specifically described, the process including a process executed by the second computation unit 922.

Figure 6:
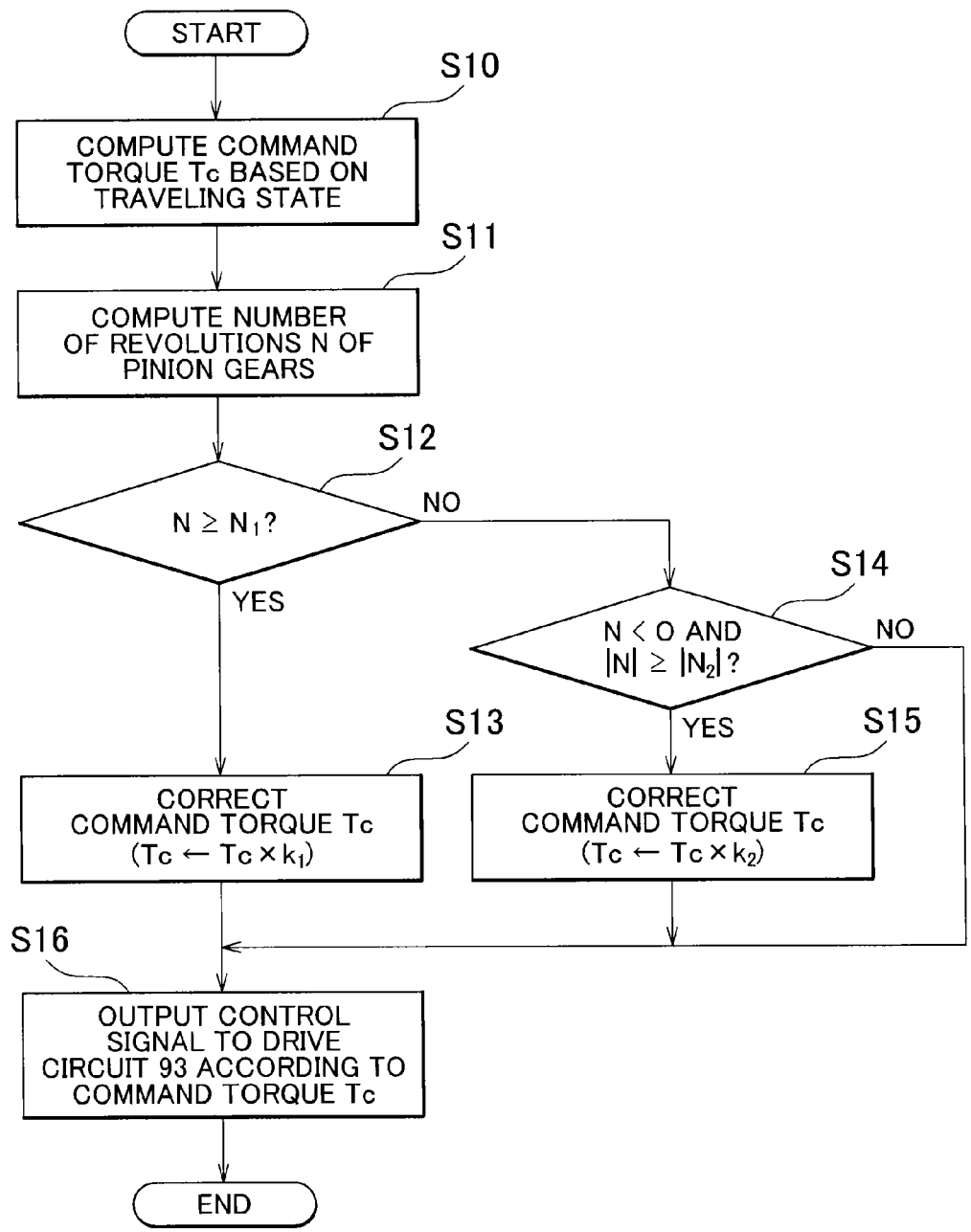
FIG. 6 is a flowchart showing an example of a process executed by the control portion.

FIG. 6 is a flowchart showing an example of the process executed by the control portion 92 functioning as the first computation unit 921, the second computation unit 922 and the control unit 923. The control portion 92 repeatedly executes the process shown by this flowchart at every predetermined control cycle (e.g., 100 ms).

The control portion 92 computes the command torque Tc according to the traveling state of the four wheel drive vehicle 100 (step S10). This process is a process executed by the control portion 92 functioning as the first computation unit 921. As the traveling state of the four wheel drive vehicle 100, the front-rear wheel rotation speed difference $\Delta V_0$, the accelerator operation amount $\phi$, the vehicle speed S, and the like may be used.

Next, the control portion 92 computes the number of revolutions N of the pinion gears 52 (step S11). The number of revolutions N of the pinion gears 52 can be computed on the basis of the rotation speed of the propeller shaft 140 and the rotation speed of the right rear wheel 105R, and the gear ratio between the ring gear 42a and the pinion gear 42b in the second gear mechanism 42. The rotation speed of the propeller shaft 140 can be computed on the basis of the rotation speeds of the front wheels 104R, 104L and the gear ratio between the ring gear 41a and the pinion gear 41b in the first gear mechanism 41. The number of revolutions N of the pinion gears 52 can be determined by a computing expression of (Nring−Nrr)×2 where Nring is the number of revolutions of the ring gear 42a per unit time and Nrr is the number of revolutions of the right rear wheel 105R per unit time.

Next, the control portion 92 determines whether the number of revolutions N of the pinion gears 52 is larger than or equal to the first predetermined value $N_1$ (step S12). This first predetermined value $N_1$ is a value of the number of revolutions N of the pinion gears 52, which corresponds to an inflection point (a point at which a gradient changes) located at the right side in the graph in FIG. 5.

If the condition of the number of revolutions N of the pinion gears 52 the first predetermined value $N_1$ is satisfied (YES in S12), the control portion 92 corrects the command torque Tc computed in step S10 by multiplying the command torque Tc by a correction factor $k_1$. This correction factor $k_1$ is smaller than 1, and it is preferable to satisfy the condition of $k_1=1/((TBR-1)/2+1)$. In this embodiment, if TBR=1.2, the correction factor $k_1=0.91$.

On the other hand, if in step S12 the condition of the number of revolutions N of the pinion gears 52≥the first predetermined value $N_1$ is not satisfied (NO in S12), the control portion 92 determines whether the number of revolutions N of the pinion gears 52 is a negative value and the absolute value of the number of revolutions N of the pinion gears 52 is larger than or equal to the absolute value of the second predetermined value $N_2$ (step S14). This second predetermined value $N_2$ is a value of the number of revolutions N of the pinion gears 52, which corresponds to an inflection point at the left side in the graph shown in FIG. 5.

If the number of revolutions N of the pinion gears 52 is smaller than 0 (N<0) and the absolute value of the number of revolutions N of the pinion gears 52 is larger than or equal to the absolute value of the second predetermined value $N_2$ (YES in S14), the control portion 92 corrects the command torque Tc computed in step S10 by multiplying the command torque Tc by a correction factor $k_2$. This correction factor $k_2$ is larger than 1, and it is preferable to satisfy the condition of $k_2=1/((1/TBR+1)/2)$. In this embodiment, if TBR=1.2, the correction factor $k_2=1.09$. On the other hand, if the condition N<0 and $|N|≥|N_2|$ is not satisfied (NO in S14), the control portion 92 does not correct the command torque Tc computed in step S10.

The process of steps S11 to S15 is a process executed by the control portion 92 functioning as the second computation unit 922.

The control portion 92 outputs a control signal to the drive circuit 93 according to the command torque Tc corrected in step S13 or step S15 or the command torque Tc that is not corrected because the result of the determination in step S14 is NO. Thus, the drive circuit 93 supplies a current in accordance with the command torque Tc to the electromagnetic coil 80 of the driving force transmission apparatus 160, and the pressing mechanism 8 of the driving force transmission apparatus 160 presses the multiple disc clutch 7 by a pressing force in accordance with the supplied current. Therefore, a driving force in accordance with the command torque Tc in step S16 is transmitted to the left rear wheel 105L via the driving force transmission apparatus 160.

For example, if the command torque Tc computed in step S10 is 200 Nm and the result of the determination in step S12 is YES, the command torque Tc is corrected in the process of step S13, and therefore, a torque of 200×$k_1$=182 Nm is transmitted to the left rear wheel 105L and a torque of 182×1.2=218.4 Nm is transmitted to the right rear wheel 105R. Thus, the total of the driving forces transmitted to the rear wheels 105R, 105L-side is 400.4 Nm.

Further, if the command torque Tc computed in step S10 is 200 Nm and the result of the determination in step S14 is YES, the command torque Tc is corrected in the process of step S15, and therefore, a torque of 200×$k_2$=218 Nm is transmitted to the left rear wheel 105L and a torque of 218/1.2=181.7 Nm is transmitted to the right rear wheel 105R. Thus, the total of the driving forces transmitted to the rear wheels 105R, 105L-side is 399.7 Nm.

Thus, by performing the process of correcting the command torque Tc in step S12 to S15, the driving force in accordance with the command torque Tc computed on the basis of the traveling state of the four wheel drive vehicle 100 (the command torque Tc computed in step S10) is accurately transmitted to the rear wheels 105R, 105L-side.

According to the foregoing embodiment, the accuracy of the driving force transmitted to the rear wheels 105R, 105L-side can be increased.

While the invention has been described with reference to the foregoing embodiment, the invention is not limited to this embodiment, and can be implemented in various manners without departing from the scope of the invention.

For example, in the foregoing embodiment, the pressing mechanism 8 that presses the multiple disc clutch 7 is constituted by the cam mechanism that is operated by the magnetic force from the electromagnetic coil 80. However, this is not restrictive. For example, the pressing mechanism 8 may be configured so that the cam mechanism is operated by a torque of an electric motor. Furthermore, the pressing mechanism 8 may be constituted by a piston that is operated by a hydraulic pressure.

Further, in the foregoing embodiment, the driving force transmission apparatus 160 is provided between the rear differential 150 and the left rear wheel 105L. However, the driving force transmission apparatus 160 may be provided between the rear differential 150 and the right rear wheel 105R.

Further, in the foregoing embodiment, the rear differential 150 is the open differential that does not have a limited-slip differential function. However, this is not restrictive, and the rear differential 150 may have a limited-slip differential function.

Further, in the foregoing embodiment, the front wheels 104R, 104L are main driving wheels, and the rear wheels 105R, 105L are auxiliary driving wheels. However, this is not restrictive, but the front wheels 104R, 104L may be auxiliary driving wheels and the rear wheels 105R, 105L may be main driving wheels.

Further, in the foregoing embodiment, the front-rear wheel rotation speed difference $ΔV_0$, the accelerator operation amount φ and the vehicle speed S are used as indexes that show the traveling state of the four wheel drive vehicle 100. However, this is not restrictive. For example, the steering angle of the front wheels 104R, 104L, the output of the engine 102, the change gear ratio of the transmission, or the like may be used as an index that shows the traveling state of the four wheel drive vehicle 100.

Further, in the foregoing embodiment, the transmission of driving force to the propeller shaft 140 can be interrupted by the dog clutch 130. However, the dog clutch 130 may be omitted. Specifically, the four wheel drive vehicle 100 may be configured so that the driving force of the engine 102 is always transmitted to the propeller shaft 140.

Further, in the foregoing embodiment, the rotation direction of the pinion gears 52 (the direction of the differential rotation between the right-side side gear 53R and the left-side side gear 53L) and the number of revolutions of the pinion gears 52 are computed on the basis of the number of revolutions Nring of the ring gear 42a and the number of revolutions Nrr of the right rear wheel 105R. However, the rotation direction and the number of revolutions of the pinion gears 52 may be computed on the basis of the rotation speeds of the right and left front wheels 104R, 104L and the rotation speed of the right rear wheel 105R. Further, a sensor capable of detecting the rotation speed of the intermediate shaft 54 or the outer housing 60 of the driving force transmission apparatus 160 may be provided, and the rotation direction and the number of revolutions of the pinion gears 52 may be computed on the basis of a detected value from this sensor and the rotation speed of the right rear wheel 105R.

According to the invention, in the four wheel drive vehicle in which the driving force transmission apparatus capable of adjusting the transmission torque is disposed between the differential apparatus and one of the right and left auxiliary driving wheels, the accuracy of the driving force transmitted to the auxiliary driving wheel side can be increased.

What is claimed is:

1. A control apparatus for a four wheel drive vehicle, the control apparatus being provided in a four wheel drive vehicle including a pair of right and left main driving wheels and a pair of right and left auxiliary driving wheels, the control apparatus controlling a transmission torque of a driving force transmission apparatus provided between one of a pair of output members of a differential apparatus at an auxiliary driving wheel side and one of the right and left auxiliary driving wheels, and the control apparatus comprising:

a first computation unit that computes a transmission torque to be transmitted to the one of the auxiliary driving wheels by the driving force transmission apparatus, based on a traveling state of the four wheel drive vehicle; and a second computation unit that corrects the transmission torque computed by the first computation unit, if a difference between rotation speeds of the output members of the differential apparatus is larger than or equal to a predetermined value, wherein the second computation unit performs a correction so as to reduce the transmission torque computed by the first computation unit, if a condition of V1>V2 is satisfied where V1 is the rotation speed of the one of the output members of the differential apparatus and V2 is the rotation speed of the other of the output members, and the second computation unit performs the correction so as to increase the transmission torque computed by the first computation unit, if a condition of V1<V2 is satisfied, and wherein the differential apparatus includes a pair of side gears as the output members and pinion gears that mesh with the side gears, respectively, and the second computation unit performs the correction if an absolute value of the number of revolutions of the pinion gears is larger than or equal to an absolute value of a predetermined value.

* * * * *